(12) United States Patent
Chszaniecki

(10) Patent No.: US 6,805,479 B1
(45) Date of Patent: Oct. 19, 2004

(54) EXTRUSION SYSTEM COMPRISING A SCREW CHANGING DEVICE

(75) Inventor: Siegfried Chszaniecki, Hannover (DE)

(73) Assignee: Berstorff, GmbH, Hanover (DE)

( * ) Notice: Subject to any disclaimer, the term of this patent is extended or adjusted under 35 U.S.C. 154(b) by 122 days.

(21) Appl. No.: 10/111,214

(22) PCT Filed: Oct. 18, 2000

(86) PCT No.: PCT/DE00/03770
§ 371 (c)(1),
(2), (4) Date: May 20, 2002

(87) PCT Pub. No.: WO01/28753
PCT Pub. Date: Apr. 26, 2001

(30) Foreign Application Priority Data

Oct. 22, 1999 (DE) .......................................... 199 52 642

(51) Int. Cl.⁷ .............................. B29B 7/42; B29B 7/58; B29C 45/62; B23P 19/04
(52) U.S. Cl. .......................... 366/79; 366/100; 425/186
(58) Field of Search .......................... 366/79, 100, 331, 366/349; 425/186, 190

(56) References Cited

U.S. PATENT DOCUMENTS

| | | | |
|---|---|---|---|
| 4,004,787 A | | 1/1977 | Ellwood et al. |
| 4,070,139 A | * | 1/1978 | Linde et al. .................... 366/79 |
| 4,384,395 A | * | 5/1983 | Gietman et al. .............. 29/234 |
| 4,678,343 A | | 7/1987 | Pontius et al. .............. 366/349 |
| 4,680,002 A | * | 7/1987 | Hehl .......................... 425/186 |
| 5,020,914 A | | 6/1991 | Würl et al. .................... 366/79 |
| 5,433,593 A | * | 7/1995 | Berger ........................ 425/186 |
| 6,164,811 A | * | 12/2000 | Planeta et al. ................ 366/79 |

FOREIGN PATENT DOCUMENTS

DE 288 350 3/1991

OTHER PUBLICATIONS

Patent Abstracts of Japan, JP 57080036, pp. 008, No. 201, Sep. 1984.
Patent Abstracts of Japan, JP 59089130, May 1984.

* cited by examiner

Primary Examiner—Tony G. Soohoo
(74) Attorney, Agent, or Firm—Cohen, Pontani Lieberman & Pavane

(57) ABSTRACT

At least one screw of a screw-type extruder drive-connected via a coupling to a gearing that is driven by a motor, the coupling being able to be coupled to and decoupled from the screw. A gearing carriage is provided which is configured such that the gearing can be drawn by a short distance on the gearing carriage in the direction of the longitudinal axis of the screw in order to decouple the coupling, and which gearing carriage can be swiveled or can move transverse to the longitudinal axis of the screw. The gearing with the coupling can be moved away from the screw to such an extent that the screw can then be withdrawn completely from the extruder counter to the feed direction of the screw, and a screw-changing device is provided by which the existing screw of the extruder can be received and can be replaced by another screw located in the screw-changing device.

13 Claims, 1 Drawing Sheet

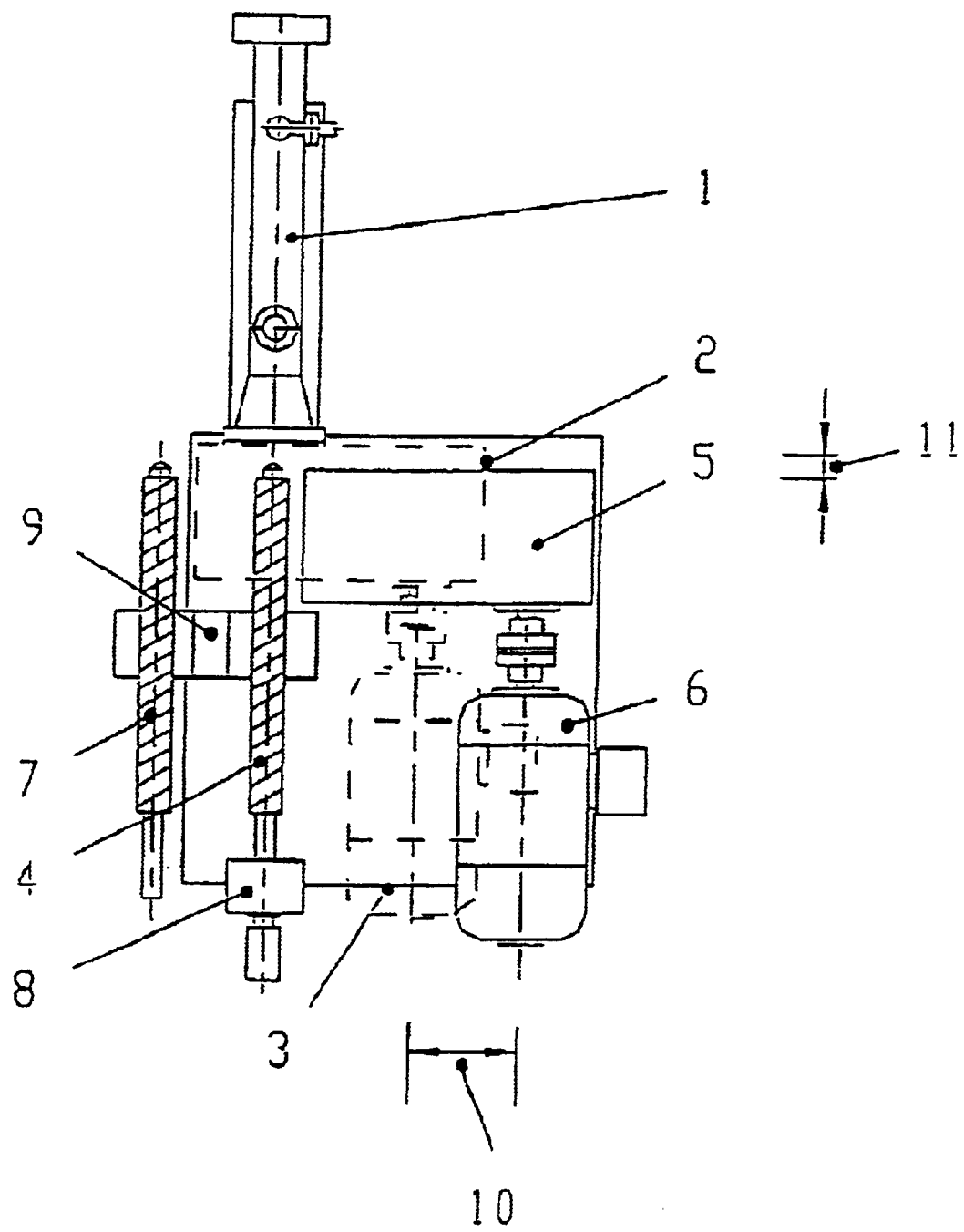

EXTRUSION SYSTEM COMPRISING A SCREW CHANGING DEVICE

This is a U.S. national stage of application NO. PCT/DE00/03770, filed on Oct. 18, 2000. Priority is claimed on that application and on the following application: Country: Germany, Application No.: 199 52 642.7, Filed: Oct. 22, 1999.

BACKGROUND OF THE INVENTION

1. Field of the Invention

Extrusion system comprising a screw-changing device The invention relates to an extrusion system comprising at least one screw-type extruder whose at least one screw is drive-connected via a coupling to a gearing that is driven by a motor, said coupling being able to be coupled to and decoupled from the screw.

2. Description of the Related Art

Extrusion systems are used particularly in the plastics industry for production of plastic products and also for compounding of plastics, i.e. for manufacturing intermediate products made up of different substances. Extrusion systems for the latter purpose are also referred to as compounding systems and in many cases have extruders with two or more screws which mesh with one another. In these compounding systems, additives such as dyes or fiber materials, for example, are mixed into the plastics raw material and distributed as uniformly as possible therein. Given the wide variety of thermoplastics in particular, and the wide variety of additives, which have different material properties in their combination, optimum production is sought by .using screws which, in their geometric configuration, are adapted as much as possible to the particular properties of the material which is to be processed. There are also screws which are comparatively well suited for the processing of a relatively broad range of materials. However, this means that, in the processing of the individual materials, such a screw or pair of screws generally has to operate some way from the actual operating optimum. This may entail a corresponding decrease in product quality and/or a reduced production rate. In large-scale systems in particular, with high throughput rates, special screws are therefore often used which are optimally suited for the processing of the particular material, in other words guarantee a very high quality at a very high production rate.

For processing plastics batches of different materials in smaller quantities, the use of special screws for the particular material involves a disproportionately high operating outlay since changing the screws has hitherto generally required a relatively high cost, particularly in the form of the shutdown of the production plant. In many operations, it is therefore customary to process smaller charges of different substances on separate machines which generally have a lower output rate than the large-scale systems for main production quantities. These separate machines not only take up a corresponding space, but are also in many cases characterized by a relatively low degree of utilization. This ultimately means that the processing of smaller batches is relatively expensive compared to the main production quantities of the standard products.

Moreover DE 3516311 C2, which corresponds to U.S. Pat. No. 4,678,343, discloses a device with a large number of molding stations arranged on a turntable, and with a jet-molding unit which can be docked onto these molding stations and with which polyurethane shoe soles are injected onto shoe uppers. The material components for the liquid polyurethane are in this case mixed in a mixing head provided with a short mixing screw which is mounted at one end and rotates at high speed (15000 to 18000 rpm). In order to change the mixing screw, the mixing-screw bearing and drive mechanism can be drawn back by means of a hydraulic cylinder system which primarily executes the displacement movement required for docking the mixing head onto the molding stations, so that the mixing screw is withdrawn completely from the mixing head before it is decoupled from the drive mechanism and replaced with another one by means of a hydraulically operated screw-changing device. In the case of longer screws, this solution would require an extremely long construction space. In contrast to jet-molding units, such docking movements are not customary in extrusion systems of the aforementioned type and, instead, the downstream equipment remains unchanged in its spatial arrangement with respect to the screw extruder during production.

Moreover, DE 3643884 A1, which corresponds to U.S. Pat. No. 5,020,914, discloses a screw-type injection molding machine in which, by means of an injection cylinder, the whole injection unit on a base frame of the injection molding machine can be advanced to the injection-molding tool. To change the screw of the injection unit, the whole drive mechanism of the screw can be drawn a short distance back from the injection cylinder on the base frame, until the screw is decoupled from the drive mechanism. To be able to remove the screw from the screw cylinder of the injection unit, the screw cylinder is pivoted about a vertical axis of rotation so that the screw can be drawn past the drive mechanism in an oblique position. For pivoting of the screw cylinder, the latter is connected to a special pivot bearing arranged for this purpose on the side.

SUMMARY OF THE INVENTION

The object of the present invention is to develop an extrusion system of the generic type in such a way as to substantially reduce the outlay required for converting the extrusion system from processing of one material to processing of another material with different properties. The aim therefore is to permit rapid changing of material while at the same time maintaining a high product quality and high productivity.

For an extrusion system of the generic type, the gearing is mounted on a gearing carriage configured to draw the gearing back a short distance in the direction of the axis of the screw in order to decouple the coupling. The carriage can be pivoted or can be moved transversely to the axis of the screw so that the gearing with the coupling can be moved away from the screw so that the screw can be withdrawn completely from the extruder counter to the feed direction of the screw. A screw-changing device is provided by which the existing screw of the extruder can be received and can be replaced by another screw in the screw-changing device.

The term "gearing carriage" should not be understood here in the narrow sense that such a gearing carriage must in fact also be provided with wheels for its movement. It could also, for example, be a sled which slides on runners in corresponding guides. However, the gearing carriage is preferably provided with rollers or wheels for its movement.

In principle, the gearing carriage could also be designed as a swivel unit so that, after the loosening of the fastening elements (e.g. screws) with which the gearing is connected securely to the extruder, said gearing with the coupling is pivoted out to the side for example, so that at the same time the coupling to the screw is decoupled and the rear space for drawing the screw back counter to its feed direction is made available. Although pivoting to the side is preferred, the pivot movement could in principle also be upward or downward.

The gearing carriage is preferably designed such that the gearing on the gearing carriage can be drawn back in the direction of the longitudinal axis of the screw in order thereby to disconnect the coupling of the screw. The gearing carriage itself can expediently be moved transverse to the longitudinal axis of the screw. To permit disconnection of the coupling, the gearing carriage can be equipped for example with a small sled whose runners extend parallel to the feed direction of the screw. The two movements for disconnecting the coupling and for moving the gearing away, with the drive motor flange-mounted thereon, could in principle also be made possible by providing the gearing carriage with wheels, for example guidable wheels.

The screw-changing device for mechanized exchange of the screw can be designed as a stationary or movable screw magazine, with a maneuvering device for withdrawal and insertion of a screw. In the simplest case, the screw magazine is designed with a rotatable double arm, where one arm is intended to receive the screw to be replaced, and the other arm carries the new screw. The screw magazine is preferably configured as a revolver magazine or paternoster magazine and is thus suited to receive a large number of replacement screws. This ensures a high degree of flexibility in terms of the processing of a correspondingly large number of different materials.

The maneuvering device for removing and inserting a screw is preferably a linearly movable slide with a gripping device for connection to the particular screw.

In principle it is possible for the movements of the gearing carriage and of the maneuvering device to be executed by an operator. In this case, the configuration of the extrusion system according to the invention relieves the operator at least from the heavy work during dismantling of the old screw and fitting of the new screw. In addition, the necessary movements of the screws can take place in set tracks, so that the time needed for screw-changing is considerably reduced.

Still greater time savings can be made if the gearing carriage and if appropriate also the screw-changing device are each provided with a motor drive. This drive is preferably actuated by an electronic control means whose program memory is preferably set up for fully automatic screw-changing.

A particularly significant saving is achieved if an extrusion system equipped with twin-screw extruders is designed in accordance with the invention, in which case the screw-changing device is set up for screw-changing in pairs. Such extrusion systems are particularly advantageous as compounding systems for processing of thermoplastics.

BRIEF DESCRIPTION OF THE DRAWING

The invention is described in greater detail below on the basis of the illustrative embodiment which is shown in highly schematic form in the single figure.

DETAILED DESCRIPTION OF THE PRESENTLY PREFERRED EMBODIMENTS

An extruder 1 which is designed as a single-screw extruder and whose downstream equipment is not shown here has a gearing 2 at its end remote from the extruder head, and a motor 3 is flange-mounted onto this gearing 2 in order to drive the extruder screw. The gearing 2, whose working position is indicated by broken lines in the figure, is equipped with a coupling (not shown) for attachment of the upstream end of the extruder screw. The gearing 2, with the motor 3 flange-mounted thereon, is mounted on a gearing carriage (of which no details are shown here). To disconnect the coupling of the gearing 2 from an extruder screw still present in the extruder 1, the gearing carriage can be drawn back a short distance counter to the feed direction of the extruder screw, for example after releasing a quick-action clamp with which the gearing 2 is connected securely to the extruder 1 during normal system operation. This decoupling path has been indicated by reference number 11 in the figure. After the extruder screw and the coupling have been separated from one another, the gearing carriage in the example shown is moved a short distance to the right, transverse to the feed direction of the extruder 1, so that the rearward space on the extruder 1 is free for screw-changing. The path of movement for screw-changing has been designated by reference number 10. The gearing 2 and the motor 3 flange-mounted thereon have been shown in the screw-changing position by means of solid lines, to distinguish this from the operating position shown in broken lines. In the screw-changing position, the gearing is indicated by reference number 5 and the motor by reference number 6. After the screw-changing position has been reached, the screw 4 of the extruder 1 can be withdrawn from the extruder 1 by means of a maneuvering device 8. It is held by a holder on a screw-changing device 9. This holder is designed for example as a two-arm pivot arm. Mounted on the other arm of this two-arm pivot arm there is another screw 7 which is to take the place of the screw 4 which has previously been in use. To do this, the maneuvering device 8 is released from the screw 4 and moved slightly farther back. The two-arm pivot arm is then turned so that the screw 7 comes into the position of the screw 4. By renewed actuation of the maneuvering device 8, the new screw 7 is then gripped and pushed into the extruder 1. After the maneuvering device 8 has been released from the screw 7 and drawn back, the gearing carriage with the gearing and the motor is then moved from the screw-changing position indicated by 5 and 6 back into the position 2, 3 shown by broken lines, that is to say is first displaced back toward the left by the displacement path 10 and then pushed back along the decoupling path 11 to the replacement screw 7 situated in the extruder 1, so that the coupling of the gearing 2 connects up to the new screw 7. In a preferred embodiment of the invention, the movements of the gearing carriage and of the screw-changing device 9 and maneuvering device 8 are effected by motor drives which are controlled by a programmable electronic control means (not shown). Since screw-changing can in this way be done practically without any intervention by personnel and in an extremely short time, there are only very brief shutdown times for the whole system and, as a consequence of this, considerably lower shutdown costs than was previously the case. In this way, it is economically feasible also to process smaller batches of plastics using a large-scale, high-performance extrusion system. This permits production of high-quality products at low costs and in small quantities.

The gearing carriage, which is indicated as a unit with the gearing 5, is mounted to the extruder frame for movement parallel and orthogonal to the axis of the extruder screw, or alternatively parallel and then pivoting so that the gearing with the coupling moves away the screw.

What is claimed is:

1. An extrusion system comprising
   a screw type extruder having at least one screw with a longitudinal axis, said screw being rotatable about said axis to extrude material in a feed direction, a gearing drive-connected to said screw via a coupling which can be coupled to and decoupled from said screw, a motor for driving said gearing, a gearing carriage on which said gearing is mounted, said gearing carriage being movable so that the gearing with the coupling can moved away from the screw so that the screw can be withdrawn from the extruder counter to the feed direction of the screw, and a screw changing device which receives said screw from said extruder and carries another screw for replacing said screw received from said extruder.

2. An extrusion system as in claim 1, wherein said screw changing device comprises a movable screw magazine and a maneuvering device for removing and inserting a screw.

3. An extrusion system as in claim 2 wherein said screw magazine is one of a revolver magazine and a paternoster magazine.

4. An extrusion system as in claim 1 wherein said gearing carriage can be drawn back in the direction of the longitudinal axis of the screw in order to decouple the coupling from the screw.

5. An extrusion system as in claim 4 wherein said gearing carriage can pivot so that the gearing can move away from the longitudinal axis of the screw.

6. An extrusion system as in claim 4 wherein said gearing carriage can move transversely to the longitudinal axis of the screw.

7. An extrusion system as in claim 1 further comprising a motor for decoupling said coupling from said screw.

8. An extrusion system as in claim 1 further comprising a motor for moving said gearing carriage.

9. An extrusion system as in claim 1 further comprising a motor for moving said screw changing device.

10. An extrusion system as in claim 1 further comprising an electronic controller for actuating movement of at least one of said coupling, said gearing carriage, and said screw changing device.

11. An extrusion system as in claim 10 wherein said electronic controller comprises a program memory which is set up for automatic screw changing.

12. An extrusion system as in claim 1 wherein said extruder is a twin screw extruder having a pair of screws, said screw changing device being set up for changing the screws in pairs.

13. An extrusion system as in claim 1 wherein said extrusion system is a compounding system for processing thermoplastics.

* * * * *